Aug. 30, 1927.
A. N. VAN NOSTRAND
1,640,384
FIELD MAGNET MECHANISM FOR TELAUTOGRAPH RECEIVERS
Filed June 30, 1926
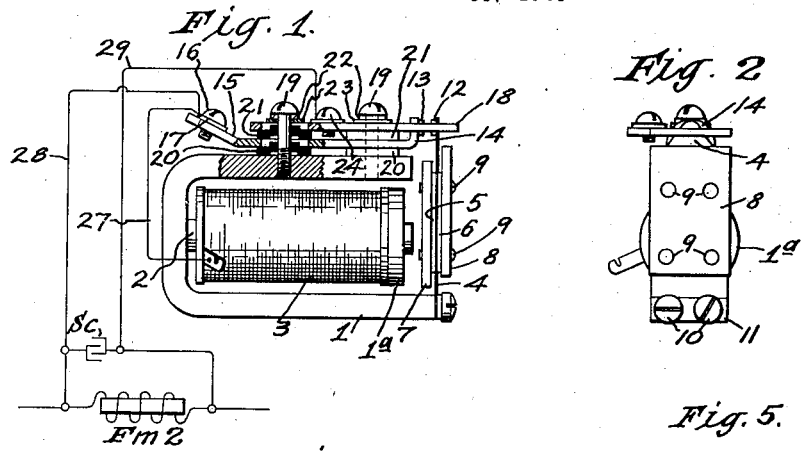
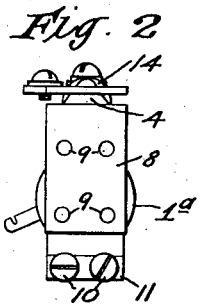
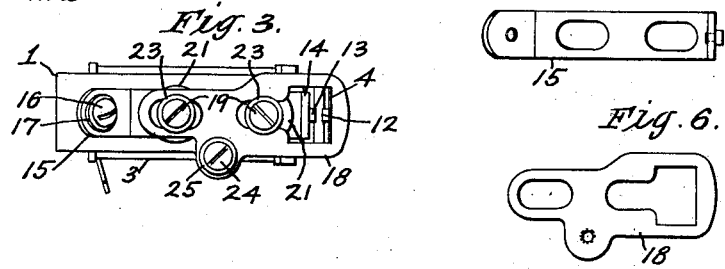
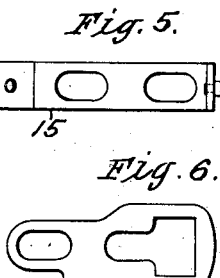
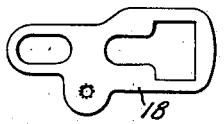
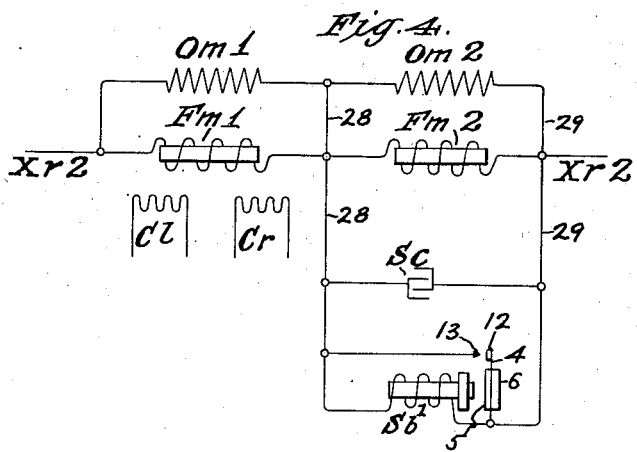
INVENTOR
Arleigh N. Van Nostrand
BY HIS
ATTORNEYS Patented Aug. 30, 1927.

1,640,384

UNITED STATES PATENT OFFICE.

ARLEIGH NEIL VAN NOSTRAND, OF FLUSHING, NEW YORK, ASSIGNOR TO TELAUTOGRAPH CORPORATION, OF NEW YORK, N. Y., A CORPORATION OF VIRGINIA.

FIELD-MAGNET MECHANISM FOR TELAUTOGRAPH RECEIVERS.

Application filed June 30, 1926. Serial No. 119,627.

This invention relates to improvements in field magnet mechanism for telautograph receivers of the variable current type.

In such a receiver, the receiver pen is controlled by two movable coils known as bucket coils, each connected to its respective writing line, both bucket coils being located in a magnetic field produced by a field magnet whose coils are included in a power circuit. Each bucket coil is acted upon yieldingly by a spring tending to retain the bucket coil in a certain initial position and is moved in opposition to the spring by the force developed by the interaction of its writing line current and the said magnetic field, so that the position of the bucket coil varies according to the strength of the writing line current. The movements of the bucket coils are communicated to the pen through suitable mechanism well known to those skilled in the art, and hence not specifically described.

It has been customary heretofore to cause a slight tremble or relatively rapid but limited vibration of the bucket coils and thereby of the pen, to overcome static friction of the pen on the paper and of the bucket coil mountings. Heretofore one method of causing this vibratory action or trembling of the bucket coils has been to cause a pulsating current to flow through the coils of the field magnet. This has been done by providing a shunt around one of the field magnet coils and including the winding of a small electro-magnet in the shunt circuit, this electro-magnet having a vibrating armature arranged to close and open a shunt branch which is in parallel with its own magnet winding. This electro-magnet and its armature constitute what is known in the art as a shaker buzzer.

A telautograph system employing the means hereinbefore described for vibrating the bucket coils and pen is shown and described in my application Serial No. 101,905, filed April 14, 1926.

In an apparatus embodying such a field magnet and means for pulsating the field magnet energizing current or part of it, the difficulty has been encountered that the periodicity of the electro-magnetic shunt interrupter or shaker buzzer is not the same as the natural period of charge and discharge of the field magnet, so that there is a relatively serious loss in electrical efficiency of the field magnet. That is, the field magnet winding with its iron core has a certain time constant, while the shaker buzzer as heretofore constructed has a vibratory period which is too quick for the time constant of the field magnet, so that the current does not have an opportunity to rise to its full value in said field magnet winding. Also because of this difference between the time constant of the field magnet and the vibratory period of the shaker buzzer, the action of the latter is rendered erratic, because of out-of-time discharges of current back through the shaker buzzer, thus interfering with the regular periodic action of the latter.

As a result of this, the receiver pen does not receive its proper periodic vibration laterally to overcome the static friction between the pen and paper, but sometimes is free from such vibration so far as the field current is concerned, at which time, if writing is in progress, the pen will tend to stick and then jump, so as to produce a ragged or rough writing.

The object of the present invention is to overcome this difficulty, and with this general object in view the invention consists in providing a shaker buzzer with means for slowing the frequency of its mechanical vibrations to suit the electrical period of the field magnet with which it coacts.

The invention will first be described in connection with the embodiment shown in the accompanying drawings, and then more particularly pointed out.

In the drawings—

Figure 1 is an elevation, partly in section, showing a shaker buzzer embodying the invention, the circuits being indicated diagrammatically;

Figure 2 is an end view of the shaker buzzer;

Figure 3 a top plan view of the same;

Figure 4 a diagrammatic view of part of the circuits of a telautograph receiver showing the two field magnet coils, the bucket coils for the right and left writing lines, the shunt circuit in which the shaker buzzer is included and the condenser for said circuit; and Figures 5 and 6 are detail views of the conductor bar 15 and the back stop plate 18 respectively.

Referring to the drawings, 1 is a yoke and 2 the core of a shaker buzzer. The yoke may have its legs of unequal length as shown in Fig. 1. On the core is placed a winding 3. To the longer leg of the yoke is secured a special type of armature comprising a plate spring 4, two plates of magnetic material on opposite sides of the plate spring along the middle portion thereof, as indicated at 5 and 6, and a mass of weighting or loading material, advantageously arranged in two portions, 7 and 8, above and below the plates 5 and 6 respectively, the whole being secured together in any suitable way, as for example, by rivets indicated at 9. The plate spring projects at each end beyond the plates 5, 6, and beyond the mass of loading material 7 and 8, one projecting end being secured to the longer leg of the yoke 1, in any suitable way, but most advantageously by a pair of machine screws 10 and a clamping plate 11. The opposite projecting free end of the plate spring 4 is provided with a contact point 12, arranged to coact with a stationary contact point 13, carried by the outward bent end 14 of an adjustable conductor bar 15, having its other end inclined outward from the yoke 1 and provided with a terminal screw 16 and washer 17. At 18 is shown a back-contact plate having an opening at one end, (Fig. 3), into which extend the free end of the plate spring 4 and the outward bent end 14 of the conductor bar 15, so that the end of said spring may contact with and be stopped by an inner wall of said opening, this being the right hand inner wall in Fig. 3.

The back-contact plate 18 and bar 15 are adjustably secured to the shorter leg of the yoke 1 in such a manner that the bar 15 is insulated in any suitable way from the yoke and from the plate 18 while the latter is in electrical communication with the yoke. This is advantageously accomplished as follows:

Two machine screws 19 are threaded into the corresponding leg of the yoke 1. On each screw there are mounted two insulating washers 20 and 21. The washers 20 lie between the conductor bar 15 and the leg of the yoke 1 and each has a boss projecting into a slot in the conductor bar. The washers 21 lie between the conductor bar 15 and the back-contact plate 18 and, like the washers 20, each has a boss projecting into a slot in the back contact plate 18. Under the head of each machine screw 19 is placed an ordinary metallic washer 22 and between each of said washers and the back-contact plate there is placed a washer 23 of insulating material. The back-contact plate 18 is provided with a terminal screw 24 and washer 25. It is in electrical connection with the yoke 1 through the screws 19 and washers 22.

It will be noted that the armature, formed by the plate spring 4, the two plates 5 and 6 of magnetic material and the mass of loading material 7 and 8 (which may also be of iron or other magnetic material or of heavier material such as lead), will have a relatively low period of vibration because of the mass of loading material.

In order, however, to slow down the electromagnetic period of the shaker buzzer electric and magnetic circuit so that it will work satisfactorily and efficiently at the slower rate of the weighted armature, the electromagnet of the shaker buzzer is provided with means for generating a counter-magneto motive force by induction from the winding of the electro-magnet, which tends to increase the time constant of the shaker buzzer electro-magnet. In practice, it is possible to slow down the period of the small shaker buzzer electro-magnet to a point where it will be equal to the natural period of charge and discharge of the field magnets, although the latter are much larger, as to winding and magnetic circuit, than is the shaker buzzer. While the means for generating a counter-magneto motive force may be any suitable closed electrical circuit arranged to act on the magnetic circuit of the shaker buzzer, in practice it is simpler to make this means as a ring or disk $1^a$, Fig. 1, of good electrical conductive material surrounding the magnetic core of the buzzer and located as close to the windings on said core as is possible. In practice these disks are made of copper and are fitted tightly onto the end of the core.

The circuit arrangements of the apparatus are as shown in Fig. 4. In this diagram $Fm^1$ and $Fm^2$ represent the two field magnets whose windings are included in the power line $Xr^2$. $Om^1$ and $Om^2$ are high resistance coils in parallel with their respective field magnet windings. $Sb$ represents the shaker buzzer generally and $Sc$ is a condenser in shunt therewith.

The winding 3 of the shaker buzzer has one end connected to the core 2 and the other end 26 connected by a jumper wire 27 to the terminal screw 16 of the conductor bar 15, this terminal screw being connected to one terminal of the field magnet $Fm^2$, as by the conductor 28.

The terminal screw 24 of the back-contact plate 18 is connected by a conductor 29 to the other terminal of the field magnet winding $Fm^2$.

When current flows in the field magnet winding it also flows through the shunt, which includes the conductors 28 and 29 and winding 3 of the shaker buzzer, thereby energizing the core of the latter and attracting its armature. The contact point 12 on the armature is brought in contact with the contact point 13 and thereby closes the circuit through conductor bar 15 from contact point 13 to terminal screw 16, this path constituting a low resistance shunt around the winding 3. The latter is of high resistance so that the amount of current flowing through it when the contacts 12 and 13 are closed is too small to hold the armature, which then is returned by the action of the plate spring 4, thus separating the contacts 12 and 13 and again allowing the current to magnetize the core. However, owing to the loading or weighting of the plate spring by the mass of loading material 7 and 8, the armature has a relatively high momentum when released and this, as well as the slow rise of the current in the winding 3, due to the choking effect of the disks 22 and 23, allows the armature of the buzzer to move a relatively considerable distance away from the core before it is stopped and then again attracted, the amount of movement, but not the speed of movement, being limited by the setting of the back stop plate 18.

That is to say, the maximum magnetic pull of the core and yoke on the armature occurs at relatively longer intervals than would be the case if the disk 1ᵃ was not employed, and the inertia of the armature is so much increased by the mass of loading material thereon, that it synchronizes well with the periods of maximum pull of the core and yoke. Hence, although the shaker buzzer is small and thereby economical and compact, it can, by the means described, be given a frequency of vibration substantially the same as the natural period of charge and discharge of the field magnet with which it is in shunt.

Because of the manner in which the conductor bar 15 carrying the contact point 13 is mounted and because of the manner of mounting the back contact plate 18, the range of vibration of the armature and its position relative to the end of the core 1 may be adjusted readily, by loosening the screws 19, sliding the parts 15 and 18 longitudinally and then tightening said screws.

What I claim is:

1. In a telautograph receiver having a field magnet including a winding and a magnetic circuit, and having a movable pen-moving coil located in the field of the field magnet, the combination with the field magnet, of a shaker buzzer arranged to vibrate the magnetic field of said field magnet, said shaker buzzer having an electro-magnetic circuit including a vibratory armature and a winding smaller than those of the said field magnet, said shaker buzzer being provided with means for slowing down its period of vibration to substantially the natural period of charge and discharge of said field magnet.

2. In a telautograph receiver having a field magnet including a winding and a magnetic circuit, and having a movable pen-moving coil located in the field of the field magnet, the combination with a field magnet, of a shaker buzzer arranged to vibrate the magnetic field of said field magnet, said shaker buzzer having an electro-magnetic circuit, including a vibratory armature, and a winding smaller than the electro-magnetic circuit and winding of the field magnet respectively, said shaker buzzer being provided with means for slowing down its period of vibration to substantially the natural period of charge and discharge of said field magnet, and a condenser in shunt to the field magnet and shaker buzzer.

3. In a telautograph apparatus having a field magnet comprising a magnetic circuit and a winding and having a movable pen-moving coil located in the field of said field magnet, the combination, with said field magnet, of a shaker buzzer having a winding, a shunt circuit around the field magnet winding and including the winding of the shaker buzzer, a vibratory armature for said shaker buzzer, said armature being arranged to make and break the shunt circuit, and a mass of loading material secured to said vibratory armature to slow down the vibratory period of said armature.

4. In a telautograph apparatus having a field magnet comprising a magnetic circuit and a winding and having a movable pen-moving coil located in the field of said field magnet, the combination, with said field magnet, of a shaker buzzer having a winding, a shunt circuit around the field magnet winding and including the winding of the shaker buzzer, a vibratory armature for said shaker buzzer, said armature being arranged to make and break the shunt circuit, and means in inductive relation to the winding of the buzzer and arranged to develop a counter-magneto motive force to slow down the electrical period of the shaker buzzer.

5. In a telautograph apparatus having a field magnet comprising a magnetic circuit and a winding and having a movable pen-moving coil located in the field of said field magnet, the combination, with said field magnet, of a shaker buzzer having a winding, a shunt circuit around the field magnet winding and including the winding of the shaker buzzer, a vibratory armature for said shaker buzzer, said armature being arranged to make and break the shunt circuit, means in inductive relation to the winding of the buzzer and arranged to develop a counter-magneto motive force, said means being so proportioned as to slow down the electrical period of the shaker buzzer to substantially the natural period of charge and discharge of the field magnet.

6. In a teleautograph apparatus having a field magnet comprising a magnetic circuit and a winding and having a movable pen-moving coil located in the field of said field magnet, the combination, with a shaker buzzer having a winding, a shunt circuit around the field magnet winding and including the winding of the shaker buzzer, a vibratory armature for said shaker buzzer, said armature being arranged to make and break the shunt circuit, a mass of loading material secured to said vibratory armature, and means in inductive relation to the winding of the buzzer and arranged to develop a counter-magneto motive force, substantially as and for the purpose described.

7. In a telautograph apparatus having a field magnet comprising a magnetic circuit and a winding and having a movable pen-moving coil located in the field of said field magnet, the combination, with the field magnet, and a shunt circuit around the field magnet winding, of a shaker buzzer having a core, a winding on said core included in said shunt circuit, said shaker buzzer also having a vibrator armature arranged to make and break the shunt circuit, a mass of loading material secured to said armature, and a disk of electrically conductive material on said core, said disk and said loading material being so proportioned as to slow down the period of vibration of the buzzer armature to substantially the period of charge and discharge of the field magnet.

8. In a telautograph apparatus having a field magnet comprising a magnetic circuit and a winding and having a movable pen-moving coil located in the field of said field magnet, the combination, with the field magnet, and a shunt circuit around the field magnet winding, of a shaker buzzer having a core, a winding on said core and included in said shunt circuit, said shaker buzzer also having a vibratory armature arranged to make and break the shunt circuit, a mass of loading material secured to said armature, a disk of electrically conductive material on said core, said disk and said loading material being so proportioned as to slow down the period of vibration of the buzzer armature to substantially the period of charge and discharge of the field magnet, and means for adjusting the range of movement of said armature.

In testimony whereof, I have hereunto set my hand.

ARLEIGH NEIL VAN NOSTRAND.